United States Patent
Matono et al.

(10) Patent No.: US 6,344,857 B1
(45) Date of Patent: Feb. 5, 2002

(54) GAMMA CORRECTION CIRCUIT

(75) Inventors: Takaaki Matono; Haruki Takata, both of Yokohama; Katsunobu Kimura, Chigasaki; Tatsuo Nagata, Fujisawa; Takeshi Sakai, Yokohama; Koichi Sudo, Fujisawa, all of (JP)

(73) Assignees: Hitachi, Ltd., Tokyo; Hitachi Video & Information System, Inc., Yokohama, both of (JP)

( * ) Notice: Subject to any disclaimer, the term of this patent is extended or adjusted under 35 U.S.C. 154(b) by 0 days.

(21) Appl. No.: 09/283,294

(22) Filed: Apr. 1, 1999

(30) Foreign Application Priority Data

Apr. 2, 1998 (JP) .............................. 10-089643

(51) Int. Cl.[7] ................................................ G09G 5/04
(52) U.S. Cl. ...................... 345/600; 345/589; 345/591; 345/593; 348/674
(58) Field of Search ................................ 345/153, 154, 345/155, 589, 591, 600, 593; 348/674

(56) References Cited

U.S. PATENT DOCUMENTS

| | | | | |
|---|---|---|---|---|
| 4,855,943 A | * | 8/1989 | Lewis | 364/575 |
| 5,526,059 A | * | 6/1996 | Lee et al. | 348/655 |
| 5,689,280 A | * | 11/1997 | Asari et al. | 345/89 |
| 5,731,796 A | | 3/1998 | Furuhashi et al. | |
| 6,020,921 A | * | 2/2000 | Aleksic et al. | 348/254 |
| 6,061,046 A | * | 5/2000 | An | 345/98 |

FOREIGN PATENT DOCUMENTS

| | | |
|---|---|---|
| JP | 8-190363 | 7/1996 |
| JP | 8-194450 | 7/1996 |
| JP | 8-227283 | 9/1996 |
| WO | 98/09269 | 3/1998 |

* cited by examiner

*Primary Examiner*—Richard Hjerpe
*Assistant Examiner*—Jean Lesperance
(74) *Attorney, Agent, or Firm*—Antonelli, Terry, Stout & Kraus, LLP

(57) ABSTRACT

A gamma correction circuit includes a node level setting unit set predetermined level values of video signals from outside, in a case where encoded M-bit (where M is an arbitrary integer) video signals being represented by using predetermined number of sections and the level values of the video signals corresponding to $2^n+1$ number of nodes (where n is an arbitrary integer) associated with the sections on which the node are specified, and a gamma correction unit for executing gamma correction for the M-bit video signal in accordance with the level values of the nodes set in the node level setting unit, thereby the gamma correction circuit executes gamma correction on various types of display devices.

21 Claims, 3 Drawing Sheets

GAMMA CORRECTION CIRCUIT

BACKGROUND OF THE INVENTION

1. Field of the Invention

The present invention relates to a gamma correction circuit for implementing favorable gradation and contrast of reproduced images in display devices such as a liquid crystal display device (hereinafter referred to as LCD), a plasma display panel (hereinafter referred to as PDP) and a digital micromirror device (hereinafter referred to as DMD).

2. Description of the Related Art

In recent years, display devices such as LCDs, PDPs and DMDs have attracted attention. Gamma characteristics of these new display devices are different from characteristics of the cathode-ray tube (hereinafter referred to as CRT) type heretofore used. In addition, display devices such as LCDs, PDPs and DMDs have also different characteristic, respectively.

Furthermore, in current television broadcast, the gamma correction is conducted on an image transmitting side so as to cancel the gamma characteristic of a display side by supposing that the display device uses a CRT.

In the case where a LCD, a PDP or a DMD is used as display device, it is necessary to correct the gamma characteristic of the image transmitting side and simultaneously therewith correct the gamma characteristic of each of display devices such as LCDS, PDPs or DMDs.

As for a circuit for implementing such gamma correction having a variable characteristic, the circuit typically includes a look up table (hereinafter referred to as LUT) for specifying a predetermined characteristic by using a ROM or the like as described, for example, in JP-A-8-190363 and JP-A-8-194450 as laid-open gazette.

A gamma correction circuit 100 using a LUT shown in FIG. 3 includes input terminals 101 to 103 respectively supplied with image signals of three systems, i.e., R (Red), G (Green) and B (Blue) before gamma correction, processing circuits 111 to 113 for correcting gamma characteristics respectively for the systems of R, G and B, LUTs 121 to 123 each having a plurality of LUTs for storing beforehand gamma characteristics conformed to display devices, a control circuit 130 for selecting one of the plurality of LUTs for each of LUTs 121 to 123 of the respective systems in conformity with the gamma characteristic of the display device, and output terminals 141 to 143 for outputting image signals after gamma correction. The LUTs 121 to 123 are stored in a ROM 120. As exemplified by the R system, a plurality of LUTs 121-1 to 121-n storing different gamma characteristics are included.

In the gamma correction circuit 100 having LUTs as shown in FIG. 3, as many tables as corresponding gamma characteristics must be prepared. In addition, it is necessary to determine the gamma characteristic and store it in the ROM beforehand. Therefore, for obtaining a gamma correction circuit corresponding to a plurality of display devices differing in gamma characteristic, such as a CRT, LCD, PDP and DMD, and corresponding to a signal subject to gamma correction beforehand, such as a TV signal, and a plurality of signals which have not been subjected to gamma correction, such as PC (personal computer) signals, the circuit scale becomes large. It is not easy to alter the gamma characteristic from the outside.

SUMMARY OF THE INVENTION

An object of the present invention is to provide a gamma correction circuit capable of altering the gamma correction characteristic according to the gamma characteristic of the display device and capable of altering the gamma correction characteristic according to the input signal, by using a small circuit scale.

In accordance with the present invention, a gamma correction circuit includes a node level setting unit and a gamma correction unit. An encoded M-bit (where M is an arbitrary integer) video signal is represented by using a predetermined number of sections. Level values of the video signal predetermined so as to be respectively associated with $2^n+1$ number of nodes (where n is an arbitrary integer) respectively determined for the sections are set in the node level setting unit from an outside. The gamma correction unit executes gamma correction of the M-bit video signal according to level values of the nodes set in the node level setting unit.

On a gamma characteristic curve representing the encoded M-bit video signal by using $2^n$ number of sections, a level of the video signal in the M sections is represented by using the $2^n+1$ number of nodes. In this case, level values of the video signal predetermined so as to be respectively associated with the nodes can be set in the node level setting unit from the outside.

The gamma correction unit may include a selection circuit supplied with level values of the $2^n$ number of nodes from the node level setting unit. The selection circuit selects and outputs a level value of a start point and a level value of an end point of each of segments virtually connected between nodes, out of the $2^n+1$ number of level values specified by the node level setting unit.

The selection circuit may includes a first selection circuit and a second selection circuit each supplied with level values of $2^n$ number of nodes from the node level setting unit. The first selection circuit and the second selection circuit respectively select and output the level value of the start point and the level value of the end point of each of segments virtually connected between the nodes, out of the $2^n+1$ number of level values specified by the node level setting unit.

The gamma correction unit may include a first control circuit for controlling the first and second selection circuits by using a value of N high-order bits (where N is an arbitrary integer) specifying the segment out of the M-bit video signal inputted from the video signal input terminal.

The gamma correction unit may include an addition circuit for calculating a mixture ratio, according to which level values of the end point and the start point outputted from the first and second selection circuits are mixed, by using a coefficient and predetermined computation, and generating a gamma corrected video signal.

The gamma correction unit may include a second control circuit for calculating the coefficient from a value of (M−N) low-order bits included in the M-bit video signal inputted from the video signal input terminal, by predetermined computation.

The node level setting unit may be connected to shift registers storing beforehand level values indicating the nodes, and the level values may be inputted from the shift registers to the node level setting unit.

The shift registers may be connected to a microprocessor, and level values of the nodes may be indicated from the microprocessor according to a characteristic of the display device.

The first control circuit may specify the segment by a value of N high-order bits out of the M-bit video signal, cause the first selection circuit to output a level value of a start point of the segment, and cause the second selection circuit to output a level value of an end point of the segment.

The node level setting unit and the gamma correction unit may be provided in a circuit of each of R system, B system and G system.

DESCRIPTION OF THE PREFERRED EMBODIMENTS

Figure 1:
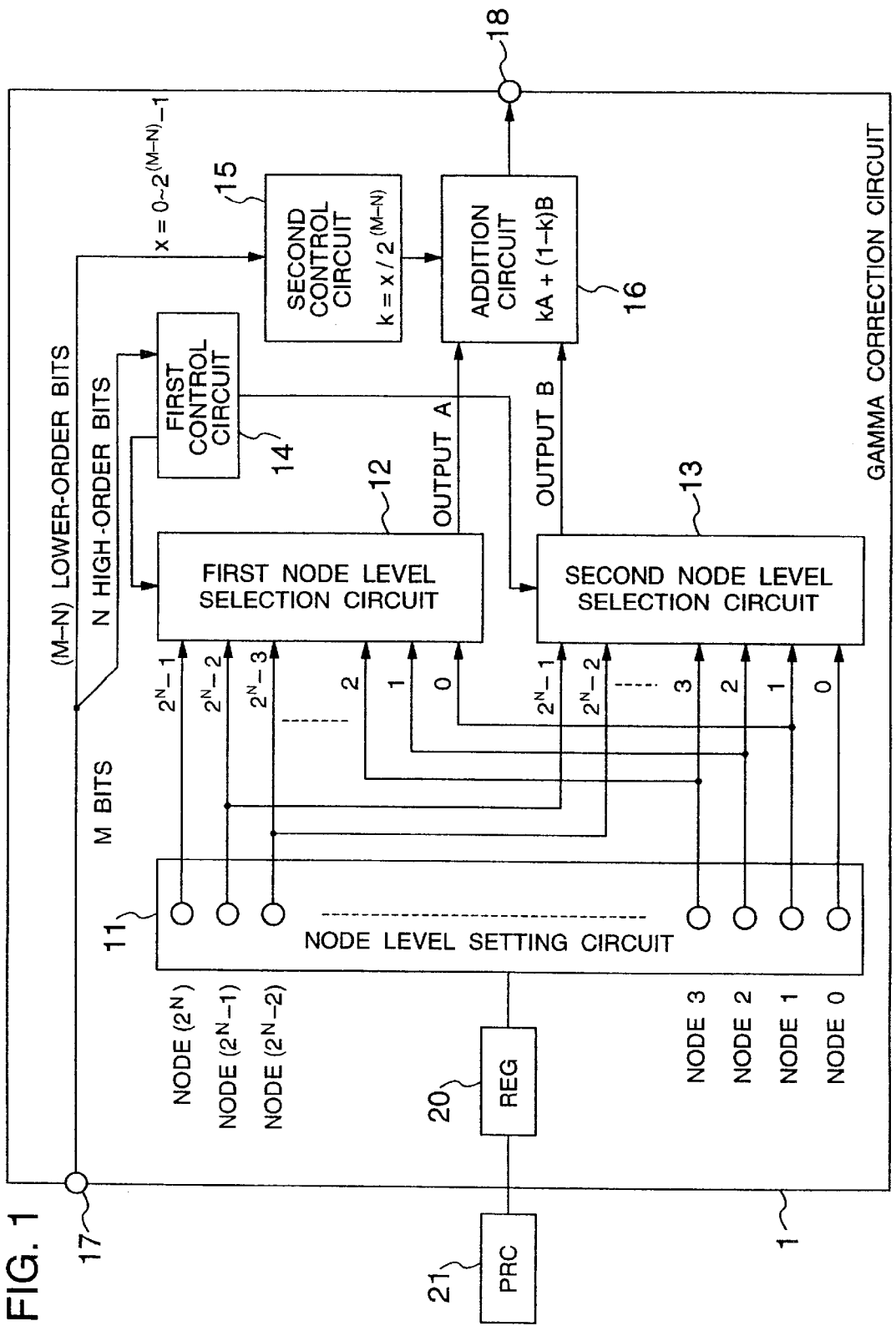
FIG. 1 is a block diagram showing the configuration of a gamma correction circuit according to the present invention.

Hereinafter, an embodiment of the present invention will be described by referring to drawing. FIG. 1 is a block diagram showing an embodiment of a gamma correction circuit according to the present invention.

With reference to FIG. 1, a gamma correction circuit 1 includes a node level setting circuit 11 for specifying at least $2^n+1$ number of node level values, where n is an arbitrary integer, a first node level selection circuit 12 supplied with $2^n$ number of level values for selecting a segment end point out of the $2^n+1$ number of level values set by the node level setting circuit 11, a second node level selection circuit 13 supplied with the $2^n$ number of level values for selecting a segment start point out of the $2^n+1$ number of level values set by the node level setting circuit 11, a video signal input terminal 17 for inputting a video signal before the gamma correction encoded in M bits, where M is an arbitrary integer, a first control circuit 14 for controlling the first node level selection circuit 12 and the second node level selection circuit 13 by using a value of N high-order bits specifying a segment out of M-bit data inputted from the video signal input terminal 17, where N is an arbitrary integer, a second control circuit 15 for outputting a coefficient for controlling a mixture ratio of level values respectively of a start point and an end point by using an adder 16 and a value of (M−N) low-order bits of an M-bit video signal inputted from the video signal input terminal 17, the adder 16 for adding outputs of the first node level selection circuit 12 and the second node level selection circuit 13 with a mixture ratio altered by the coefficient supplied from the second control circuit 15, and a video signal output terminal 18 for outputting an output signal of the adder 16 after gamma correction.

Figure 2:
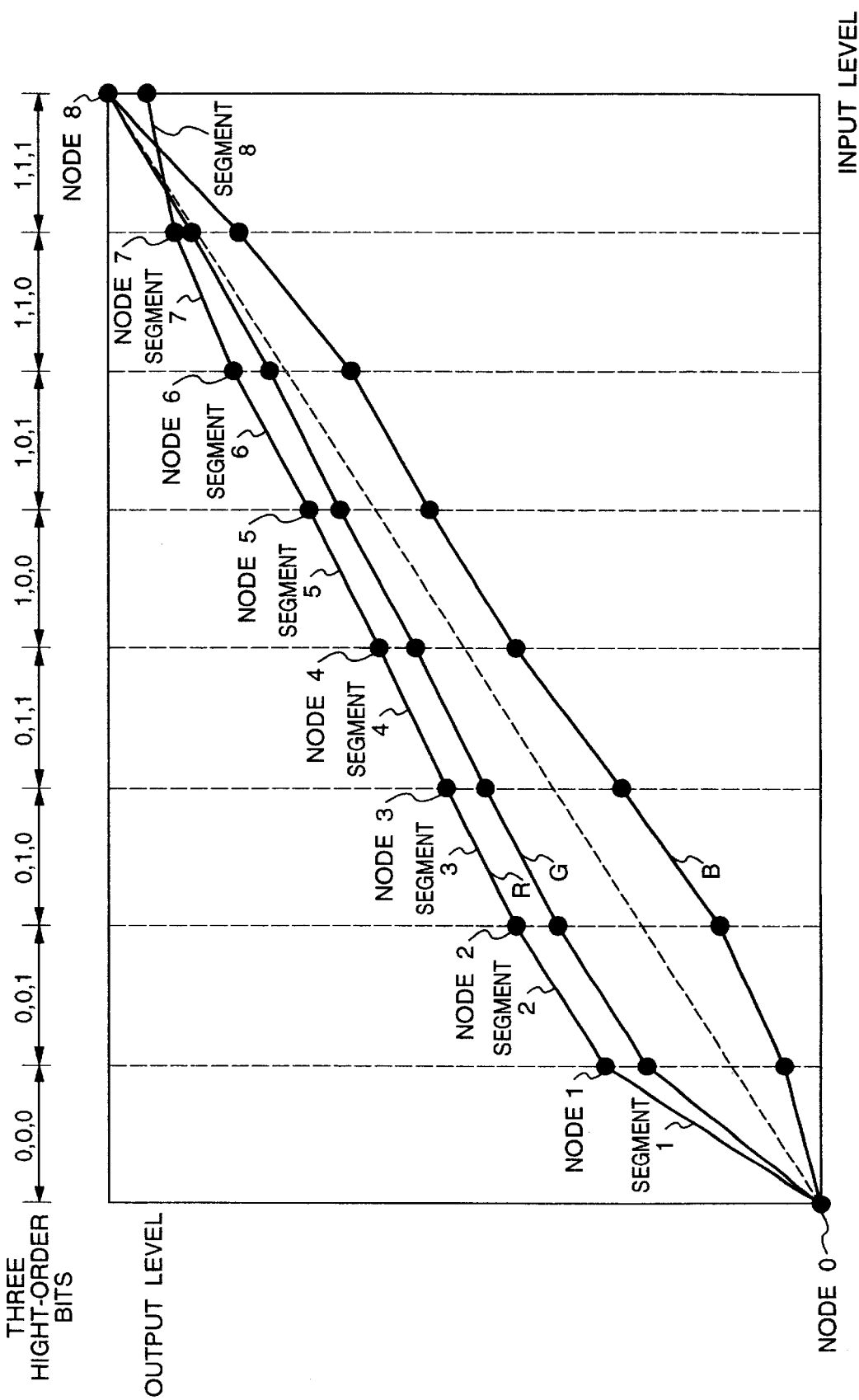
FIG. 2 is a diagram showing an example of gamma characteristics which can be implemented by the present invention.
Figure 3:
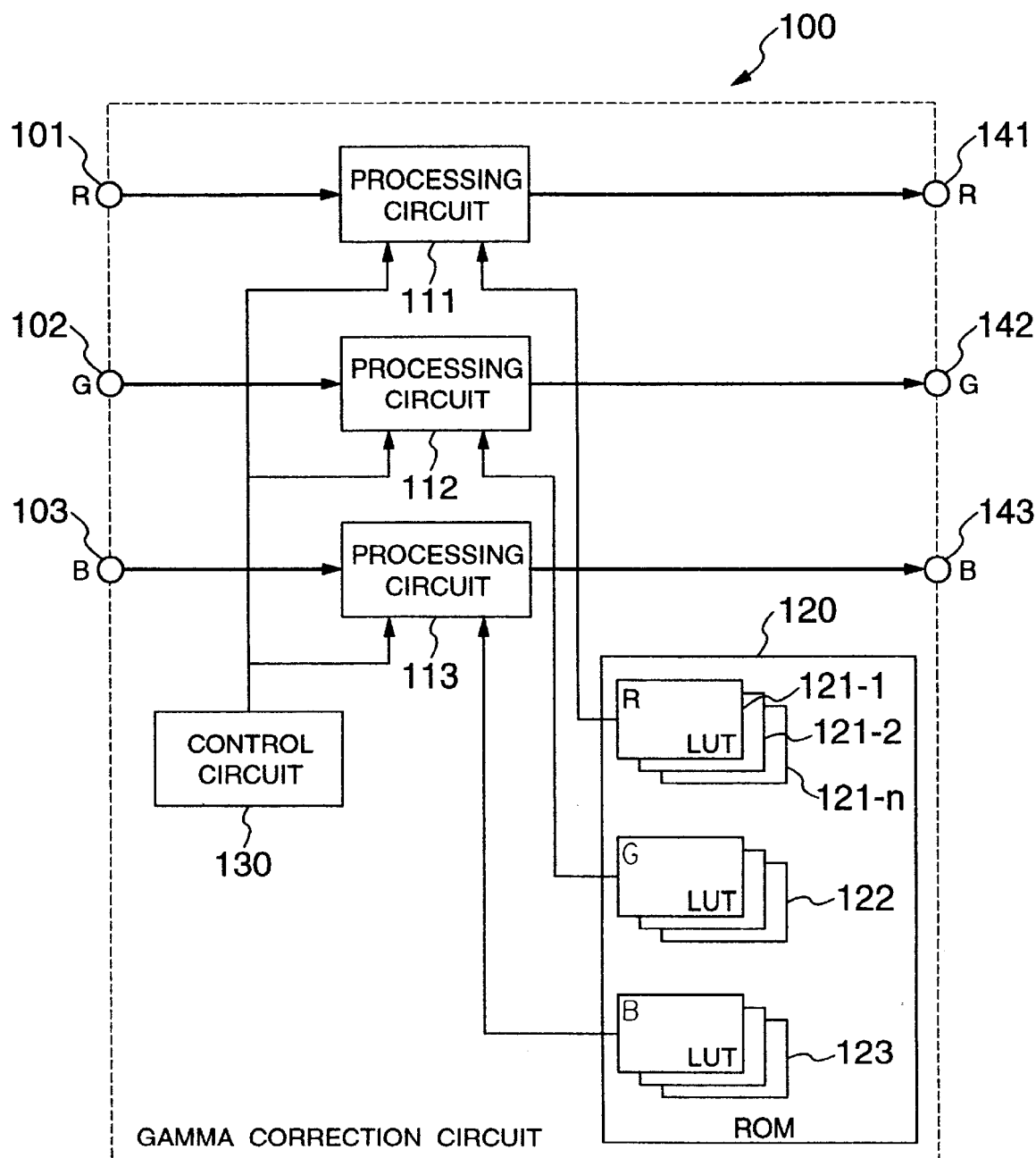
FIG. 3 is a block diagram showing the configuration of a gamma correction circuit which is an example of related art.

Here, nodes and segments will be described. As shown in FIG. 2, predetermined gamma characteristic curves are supposed. Assuming now that a video signal inputted from the video signal input terminal 17 is represented by eight bits and the video signal is divided into eight sections by using three high-order bits included in the eight bits, there are number $2^3+1$ of partitions. Points existing on these partitions and each represented by an input level value and an output level value of a video signal are referred to as nodes. Each of lines virtually connecting nodes is referred to as segment. In each segment, a node indicating a low level value is referred to as start point, and a node indicating a high level value is referred to as end point.

FIG. 2 shows an example of the gamma characteristic obtained in the present embodiment. Black dots indicate output level values which can be specified at respective nodes. A gamma characteristic curve formed of eight segments can be implemented. This gamma characteristic shows an example in which gamma characteristics of the three systems, i.e., R, G and B are corrected independently. It is possible to specify gamma characteristics independently and respectively for the systems of R, G and B.

By taking as an example, the case where a video signal encoded in eight bits (M=8) is inputted from the video signal input terminal 17 and the gamma characteristic of eight nodes (N=3) is implemented, operation of the gamma correction circuit 1 of, for example, the R system will now be described.

Output level values (set level values) of nine ($=2^3+1$) nodes drawing a predetermined gamma characteristic curve shown in FIG. 2 and ranging from node 0 to node 8 are specified in the node level setting circuit 11 by using eight bits for each of the nodes. This can be implemented by, for example, specifying level values in nine eight-bit shift registers 20. Furthermore, by connecting the shift registers 20 to a microprocessor 21 and setting level values corresponding to nodes of display devices differing in characteristic, such as a LCD, PDP and DMD, from the microprocessor, gamma correction can be implemented. Although the level values can be set from the outside, it is not always necessary to make all of the nine nodes variable.

As for the gamma characteristic curve set in the node level setting circuit 11, the axis of abscissas represents an input level value and the axis of ordinates represents an output level value, and the gamma characteristic curve is represented by eight segments connecting nine nodes.

The eight segments 1 to 8 have three high-order bits equivalent to "000", "001", "010", "011", "100", "101", "110" and "111", respectively. As for output level values of nine nodes (nodes 0 to 8), for example, output level values of the nodes 0 to 7 can be made values at points where the input level has five low-order bits "00000", and an output level value of the node 8 can be made a value at a point where the input level has five low-order bits "11111".

Among node level values outputted from the node level setting circuit 11, level values of end points of the node 8 to node 1 are inputted respectively to points of the first node level selection circuit 12 associated with three high-order bits, and level values of start points of the node 0 to node 7 are inputted respectively to points of the second node level selection circuit 13 associated with the three high-order bits. The level value of the first node level selection circuit 12 specifies the output level value of the end point of each segment. The level value of the second node level selection circuit 13 specifies the output level value of the start point of each segment.

Among the eight bits of the video input signal inputted from the video signal input terminal 17, three high-order bits are inputted to the first control circuit 14. By controlling the first node level selection circuit 12, the first control circuit 14 selects an output level value "A" of an end point of a segment included in the eight segments and associated with input data of the three high-order bits. By controlling the second node level selection circuit 13, the first control circuit 14 selects an output level value "B" of a start point of a segment included in the eight segments and associated with input data of the three high-order bits.

Among the eight bits of the video input signal inputted from the video signal input terminal 17, five-low order bits are inputted to the second control circuit 15. A value x of the five bits is in the range of x=0 to $(2^5-1)$. From the inputted five low-order bits, the second control circuit 15 generates a coefficient $k=x/2^5$.

To the addition circuit 16, there are inputted the output signal A of the end point selected by the first node level selection circuit 12, the output signal B of the start point selected by the second node level selection circuit 13, and the coefficient k supplied from the second control circuit 15.

By using the coefficient k supplied from the second control circuit 15 and the output signals A and B supplied from the node level selection circuits 12, 13, the adder 16 conducts computation in accordance with an expression of kA+(1−k) B, and specifies an output level value between the start point and the end point of each segment.

An output signal computed by the adder 16 is outputted from the video signal output terminal 18. A video output is thus obtained after gamma correction.

The case where an eight-bit video signal of "01110101" is inputted to the gamma correction circuit 1 will now be described. For the segment 4 having the three high-order bits "011", it is now assumed that the output level value of the node 3 is set to "90" and the output level value of the node 4 is set to "120". It then follows that x=21, k=21/32, A=120, and B=90. Therefore, the output of the adder 16 becomes approximately 110.

As described above, the gamma correction circuit 1 is formed of the node level setting circuit 11 supplied with the number (M) of bits of the video signal plus 1 (=M+1) data, the two node level selection circuits 12 and 13, the two control circuits 14 and 15, and the adder 16. As a result, correction of the gamma characteristic can be conducted on the video input signal.

Furthermore, since the gamma characteristic of this gamma correction circuit 1 can be easily altered by rewriting the node level setting circuit 11, the gamma correction circuit 1 corresponding to a display device, such as a LCD, PDP, and DMD, can be obtained.

In the foregoing description, an example in which correction of the gamma characteristic is conducted for the R system has been shown. It is also possible to provide gamma correction circuits for the G system and the B system as well and conduct gamma correction for the R, G and B systems respectively and independently. Alternatively, it is also possible to use one gamma correction circuit and provide the three systems of R, G and B with the same gamma characteristic.

The gamma correction circuit shown in FIG. 1 can be incorporated as a one-chip LSI. By incorporating it in display devices of all different types, video images corresponding to the video transmitting side can be displayed. It is a matter of course that the shift registers 20 and the microprocessor 21 can also be incorporated into the one-chip LSI.

What is claimed is:

1. A gamma correction circuit for providing gamma correction for each of display device and input signal, comprising:
    a node level setting means set predetermined level values of video signals from outside, in a case where encoded M-bit (where M is an arbitrary integer) video signals being represented by using predetermined number of sections and the level values of the video signals corresponding to $2^n+1$ number of nodes (where n is an arbitrary integer) associated with the sections on which the nodes are specified; and
    a gamma correction means for executing gamma correction of the M-bit video signal in accordance with the level values of the nodes set in said node level setting means.

2. A gamma correction circuit according to claim 1, wherein
    said node level setting means is set the predetermined level values of the video signals from the outside such that the level values correspond to the nodes, in a case where the levels of the video signals associated with $2^n$ number of sections being represented by the $2^n+1$ number of nodes on a gamma characteristic curve representing the encoded M-bit video signal by using the number of $2^n$ sections.

3. A gamma correction circuit according to claim 2, further comprising a video signal input terminal for inputting the video signal encoded in M bits.

4. A gamma correction circuit according to claim 1, wherein the gamma correction means includes a selection circuit receiving the level values corresponding to the $2^n$ number of nodes from said node level setting means, and selecting a level value of a start point and a level value of an end point of segments virtually connected between the nodes associated with the $2^n+1$ number of level values specified by said node level setting means to output the level values.

5. A gamma correction circuit according to claim 4, wherein said selection circuit includes: a first selection circuit receiving the level values corresponding to the $2^n$ number of nodes from said node level setting means, and selecting the level value of the start point of the segments virtually connected between the nodes associated with the $2^n+1$ number of level values specified by said node level setting means to output the level value of the start point, and
    a second selection circuit receiving the level values corresponding to the $2^n$ number of nodes from said node level setting means, and selecting the level value of the end point of the segments virtually connected between the nodes associated with the $2^n+1$ number of level values specified by said node level setting means to output the level value of the end point.

6. A gamma correction circuit according to claim 5, wherein said gamma correction means includes a first control circuit for controlling said first and second selection circuits by using a value of N high-order bits (where N is an arbitrary integer) specifying the segment out of the M-bit video signal inputted from the video signal input terminal.

7. A gamma correction circuit according to claim 6, wherein said gamma correction means includes an adder for calculating a mixture ratio, according to which the level values of the end point and start point outputted from said first and second selection circuits are mixed, by using a coefficient and predetermined computation, and generating a gamma corrected video signal.

8. A gamma correction circuit according to claim 7, wherein said gamma correction means includes a second control circuit for calculating the coefficient from a value of (M−N) low-order bits included in the M-bit video signal inputted from the video signal input terminal, by predetermined computation.

9. A gamma correction circuit according to claim 7, wherein said adder includes a video signal output terminal for outputting the gamma corrected video signal.

10. A gamma correction circuit according to claim 7, wherein said node level setting means is connected to a shift register storing beforehand the level values indicating the nodes, and the level values are inputted from said shift register to said node level setting means.

11. A gamma correction circuit according to claim 10, wherein said shift register is connected to a microprocessor, and the level values of the nodes are indicated from said microprocessor in accordance with a characteristic of a display device.

12. A gamma correction circuit according to claim 10, wherein said first control circuit specifies the segment by a value of N high-order bits out of the M-bit video signal, causes said first selection circuit to output the level value of the start point of the segment, and causes said second selection circuit to output the level value of the end point of the segment.

13. A gamma correction circuit according to claim 1, wherein said node level setting means and said gamma correction means are provided in each circuit of R-system, B-system and G-system.

14. A gamma correction circuit for applying a gamma correction to an input video signal inputted thereto and outputting a gamma-corrected output video signal therefrom, the gamma correction circuit comprising:

a node level setting circuit which sets a plurality of node levels representing a corresponding plurality of output levels of the gamma-corrected output video signal for a corresponding plurality of predetermined input levels of the input video signal, thereby specifying a gamma correction characteristic for the gamma correction circuit, the plurality of node levels being supplied to the node level setting circuit from outside the gamma correction circuit; and an operation circuit which uses at least two node levels of the plurality of node levels set by the node level setting circuit to obtain output levels of the gamma-corrected output video signal for input levels of the input video signal between two predetermined input levels of the input video signal corresponding to the two node levels.

15. A gamma correction circuit for applying a gamma correction to an input video signal inputted thereto and outputting a gamma-corrected output video signal therefrom, the gamma correction circuit comprising:

a node level setting circuit which sets a plurality of node levels representing a corresponding plurality of output levels of the gamma-corrected output video signal for a corresponding plurality of predetermined input levels of the input video signal, thereby specifying a gamma correction characteristic for the gamma correction circuit, the plurality of node levels being supplied to the node level setting circuit from outside the gamma correction circuit; and an operation circuit which uses input levels of the input video signal and at least two node levels of the plurality of node levels to obtain output levels of the gamma-corrected output video signal corresponding to the input levels of the input video signal, thereby applying a gamma correction to the input video signal, the two node levels respectively corresponding to a start point and an end point of a range including the input levels of the input video signal.

16. A gamma correction circuit according to claim 15, wherein the input video signal is a digital input video signal encoded with M bits, where $M=2^N$, and N is an arbitrary integer; and wherein the node level setting circuit sets M+1 node levels as the plurality of node levels.

17. A gamma correction circuit according to claim 16, further comprising:

a first control circuit which selects two node levels A and B from the plurality of node levels set by the node level setting circuit, and supplies the node levels A and B to the operation circuit, the node level A corresponding to a start point of a range of input levels of the digital input video signal specified by N high-order bits of the digital input video signal, and the node level B corresponding to an end point of the range of input levels of the digital input video signal specified by the N high-order bits of the digital input video signal; and a second control circuit which determines a coefficient k using M−N low-order bits of the digital input video signal, and supplies the coefficient k to the operation circuit;

wherein the operation circuit includes an addition circuit which obtains an output level $L_{out}$ of the gamma-corrected output video signal corresponding to an input level of the digital input video signal using the node levels A and B selected by the first control circuit and the coefficient k determined by the second control circuit in accordance with the following expression:

$$L_{out}=kA+(k-1)B.$$

18. A gamma correction circuit according to claim 17, wherein the M−N low-order bits of the digital input video signal represent a value x; and wherein the second control circuit determines the coefficient k in accordance with the following expression:

$$k=x/2^{M-N}.$$

19. A gamma correction circuit according to claim 15, further comprising:

a first control circuit which selects two node levels A and B from the plurality of node levels set by the node level setting circuit, and supplies the node levels A and B to the operation circuit, the node level A corresponding to a start point of a range of input levels of the digital input video signal, and the node level B corresponding to an end point of the range of input levels of the digital input video signal; and a second control circuit which determines a coefficient k using an input level of the digital input video signal, and supplies the coefficient k to the operation circuit.

20. A gamma correction circuit according to claim 19, wherein the operation circuit includes an addition circuit which obtains an output level $L_{out}$ of the gamma-corrected output video signal corresponding to an input level of the digital input video signal using the node levels A and B selected by the first control circuit and the coefficient k determined by the second control circuit in accordance with the following expression:

$$L_{out}=kA+(k-1)B.$$

21. A gamma correction circuit according to claim 15, wherein the plurality of node levels set by the node level setting circuit are rewritable by the node level setting circuit.

* * * * *

UNITED STATES PATENT AND TRADEMARK OFFICE
CERTIFICATE OF CORRECTION

PATENT NO. : 6,344,857 B1
DATED : February 5, 2002
INVENTOR(S) : Matono et al.

It is certified that error appears in the above-identified patent and that said Letters Patent is hereby corrected as shown below:

Title page,
Item [56], after "FOREIGN PATEN DOCUMENTS", please insert the following section:
-- OTHER PUBLICATIONS
Minamizaki, et al., "P-14: Low Output Offset, 8 bit Signal Drivers for XGA/SVGA TFT-LCDs", Proceedings of the 16th International Display Research Conference Eurodisplay 1996, Birmingham, Oct. 1-3, 1996, no. CONF. 16, 1 October 1996, pp. 247-250. --

Signed and Sealed this

Twenty-sixth Day of August, 2003

JAMES E. ROGAN
*Director of the United States Patent and Trademark Office*